United States Patent [19]
Ordonez et al.

[11] 3,905,826
[45] Sept. 16, 1975

[54] SETTING RETARDER COMPOSITION FOR USE IN CEMENTATION AND RECEMENTATION OF CASED OIL WELLS

[75] Inventors: Raul Poblano Ordonez, Xochimilco; Antonio Acuna Rosado, Tlalnepantla; Francisco Garaicochea Petrirena, Santa Maria la Rivera; Edith Rivera de Campos, Atzcapotzalco la Villa, Mexico

[73] Assignee: Instituto Mexicano del Petroleo, Mexico City, Mexico

[22] Filed: Jan. 8, 1974

[21] Appl. No.: 431,806

Related U.S. Application Data

[63] Continuation-in-part of Ser. No. 292,588, Sept. 27, 1972, abandoned.

[30] Foreign Application Priority Data

Jan. 10, 1972 Mexico ............................. 133376

[52] U.S. Cl. .................. 106/315; 106/92; 106/93
[51] Int. Cl.² .................. C04B 13/22; C04B 13/24
[58] Field of Search .................. 106/315, 92, 93

[56] References Cited
UNITED STATES PATENTS

| | | | |
|---|---|---|---|
| 2,374,628 | 4/1945 | Swayze | 106/92 |
| 2,673,810 | 3/1954 | Ludwig | 106/93 |
| 3,754,953 | 8/1973 | Martin | 106/315 |

*Primary Examiner*—J. Poer
*Attorney, Agent, or Firm*—Ladas, Parry, Von Gehr, Goldsmith & Deschamps

[57] ABSTRACT

A setting retarding composition for cement comprising a mixture of carboxymethyl cellulose, borax and dextrin in ranges producing a synergistic effect.

3 Claims, No Drawings

SETTING RETARDER COMPOSITION FOR USE IN CEMENTATION AND RECEMENTATION OF CASED OIL WELLS

This application is a continuation-in-part of our earlier filed application Ser. No. 292,588 filed Sept. 27, 1972 and now abandoned.

This invention relates to a composition for retarding the setting of cement. It particularly is useful in the cementation or recementation of oil well pipes and cased bore holes.

Cementation of cased bore holes has been a common practice in drill string, finishing and repairing operations for oil wells. The procedure comprises conveying a cement slurry to the bottom of a well through the pipe to be cemented and to force it into the annular space between the outside of the pipe and the wall of the well, where it sets and hardens.

Once cement has been mixed with water, the process of setting begins and becomes faster as the ambient temperature and atmospheric pressure rise. As the cement slurry proceeds to the bottom of the well, conditions tend to accelerate the rate of setting. However, for successful operation, it is necessary to keep the cement slurry in a fluid and workable condition so that it can be pumped.

Heretofore, various setting retarders have been incorporated in the cement slurry to counteract the setting acceleration. In particular carboxymethyl cellulose (CMC) and alkali salts thereof, borax (sodium tetraborate) and dextrin have been used individually. Each of these, under conditions of use have little effect on the setting rate and impart undesirable properties to the slurry.

It has now been unexpectedly found that the use of all three compounds simultaneously within certain specific ranges, produces a synergistic effect and optimum results.

In accordance with the invention a composition for retarding the setting of cement is provided which comprises a mixture of at least one of the group consisting of carboxymethyl cellulose and alkali salts of carboxymethyl cellulose, borax and dextrin, in the proportions by weight of 35 to 40%, 30 to 35% and 25 to 30%, respectively.

Inorganic alkali salts may if desired be included in the composition.

The compositions of the invention can be used with any conventional cement slurry.

In order that the invention may be fully understood, it will be described with reference to the accompanying Tables which set forth experimental results, various ingredients and concentrations using a cement slurry (Type G according to the cement classification of the American Petroleum Institute). The test results include thickening time, viscosity, yield point, compression resistance and water loss, of which the thickening time is the most important for satisfactory formulations of the composition.

Table I provides results for comparative purposes using no additives, and using NaCMC, borax and dextrin, individually.

Table II provides results using NaCMC, borax and dextrin in admixture in various formulations.

Table III provides results showing further improvements by including inorganic alkali salts in the formulations.

Upon analyzing the results of Table I, it is observed that CMC, borax and dextrin, if utilized separately for dosing slurries of Type "G" cement, at a temperature of 206°F., have little effect as setting retarders; also, the slurries show the following undesirable properties:

a. The thickening time of slurries prepared with 0.3% by weight of CMC is only 1:12 hr./min. On the other hand, slurry properties with CMC at concentrations above 0.3% have the defect of being viscous and their yield points are extremely high, making it difficult and sometimes impossible to handle them with the equipment that is conventional in oil wells for carrying out cementations.

b. The slurries prepared with borax show adequate rheological properties and high resistance, but their thickening times are extremely low.

c. Dextrin destroys the consistency of the slurries making the solid cement particles segregate; also, the slurries containing Dextrin have the undesirable defect of regression in their thickening time.

Table II demonstrates by experimental results that by using the novel mixtures of CMC, borax and dextrin, according to the present invention, the undesirable effects caused by each one of these compounds are corrected and more than compensated, when said compounds are mixed in percentages ranging from 35–40, 30–35 and 25–30 of CMC, borax and dextrin, respectively. The viscosity effect and the high yield point of the slurries caused by CMC alone, is corrected when dextrin is used; reciprocally the defect due to dextrin, of destroying the consistency of the slurries, as well as the high water losses, are compensated by means of the CMC. Borax is utilized in order to increase the cement resistance; also, mixing it with CMC increases the thickening time. On the other hand, and according to the data of Table II, the adequate dosification of CMC, borax and dextrin eliminates the regression disadvantage of the thickening time due to dextrin.

It has been experimentally determined that the optimum formulation of CMC, borax and dextrin is achieved when said components participate in a percentage ratio of 40, 32.5 and 27.5, respectively.

The use of this formulation with alkali metal salts such as sodium and potassium salts also provides satisfactory results as it can be observed from the attached Table III.

All the test results in these tables were made following the laboratory procedures set forth by the American Petroleum Institute, noted in the API-RP-10B report "Recommended Practice for Testing Oil Well Cements and Cement Additives".

TABLE I

EXPERIMENTAL LABORATORY DATA AND RESULTS OF MIXTURES PREPARED WITH TYPE "G" CEMENT. DIFFERENT CMC, BORAX AND DEXTRIN CONCENTRATIONS

| % of mixture in cement | % of active agent by weight of cement | | | Thickening Time Hr./min. 206°F. | Viscosity cp 144°F. | Yield Point Lb./100 sq. ft. 144°F. | Compression Resistance at 8 hrs. Kg./sq. cm. 290°F. | Water Loss cm³/30 min. ΔP = 1000 psi. 206°F. |
|---|---|---|---|---|---|---|---|---|
| | Na CMC | Borax | Dextrin | | | | | |
| 0.0 | 0.00 | 0.000 | 0.000 | 0:45 | | | | +1000 |
| 0.3 | 0.30 | — | — | 1:12 | 30 | 65 | | |
| 0.4 | 0.40 | — | — | 1:25 | 30 | * | | |
| 0.5 | 0.50 | — | — | 1:40* | * | *. | | |
| * LOW THICKENING TIMES AND YIELD POINTS EXTREMELY HIGH | | | | | | | | |
| 0.4 | — | 0.40 | — | 0:55 | 22 | 48 | 280 | +1000 |
| 0.8 | — | 0.80 | — | 1:00* | 20 | 45 | 305 | +1000 |
| * LOW THICKENING TIMES | | | | | | | | |
| 0.3 | — | — | 0.3 | 2:50 | 23 | 0* | | +1000 |
| 0.4 | — | — | 0.4 | 4:32 | 22 | 0 | | +1000 |
| 0.6 | — | — | 0.6 | 2:29* | 14 | 0 | | +1000 |
| 1.0 | — | — | 1.0 | 1:27 | 12 | 0 | | +1000 |

* UNDESIRABLE REGRESSION IN THICKENING TIME. SLURRY RHEOLOGICAL PROPERTIES ARE DESTROYED AND THERE IS HIGH WATER LOSS

TABLE II

| % of mixture in cement | % of active agent by weight of cement | | | Thickening Time Hr./min 206°F. | Viscosity cp 144°F. | Yield Point Lb./100 sq. ft. 144°F. | Compression Resistance at 8 hrs. Kg./sq. cm. 290°F. | Water Loss cm³/30 min. ΔP = 1000 psi. 206°F. |
|---|---|---|---|---|---|---|---|---|
| | Na CMC | Borax | Dextrin | | | | | |
| % | FORMULATION 5/85/10 | | | | | | | |
| 0.4 | 0.020 | 0.3400 | 0.0400 | 1:05 | 20 | 50 | 245 | +1000 |
| 0.8 | 0.040 | 0.6800 | 0.0800 | 1:25 | 18 | 44 | 250 | +1000 |
| 1.0 | 0.050 | 0.8500 | 0.1000 | 1:30 | — | — | — | — — |
| | FORMULATION 10/30/60 | | | | | | | |
| 0.4 | 0.040 | 0.1200 | 0.2400 | 2:30 | 30 | 12 | | |
| 0.8 | 0.080 | 0.2400 | 0.4800 | 4:00 | 26 | 8 | | |
| 1.0 | 0.100 | 0.3000 | 0.6000 | 2:20 | 16 | 0 | | |
| | FORMULATION 80/10/10 | | | | | | | |
| 0.4 | 0.320 | 0.0400 | 0.0400 | 1:30 | 28 | 64 | | |
| 0.8 | 0.640 | 0.0800 | 0.0800 | 1:55 | * | * | | |
| | FORMULATION 60/20/20 | | | | | | | |
| 0.4 | 0.240 | 0.0800 | 0.0800 | 1:50 | 25 | 60 | | |
| 0.8 | 0.480 | 0.1600 | 0.1600 | 2:10 | 54 | 100 | | |
| | FORMULATION 30/30/40 | | | | | | | |
| 0.4 | 0.1200 | 0.1200 | 0.1600 | 2:30 | | | | |
| 0.8 | 0.2400 | 0.2400 | 0.3200 | 3:12 | | | | |
| 1.0 | 0.3000 | 0.3000 | 0.4000 | 3:25 | | | | |
| 1.5 | 0.4500 | 0.4500 | 0.6000 | 2:50 | | | | |
| | FORMULATION 35/35/30 | | | | | | | |
| 0.4 | 0.1400 | 0.1400 | 0.1200 | 2:15 | | | | |
| 0.8 | 0.2800 | 0.2800 | 0.2400 | 3:20 | | | | |
| 1.0 | 0.3500 | 0.3500 | 0.3000 | 3:50 | | | | |
| 1.5 | 0.5250 | 0.5250 | 0.4500 | 4:15 | | | | |
| % | FORMULATION 40/30/30 | | | | | | | |
| 0.4 | 0.1600 | 0.1200 | 0.1200 | 2:20 | 32 | 28 | | |
| 0.8 | 0.3200 | 0.2400 | 0.2400 | 3:35 | 30 | 24 | | |
| 1.0 | 0.4000 | 0.3000 | 0.3000 | 4:00 | — | — | | |
| 1.5 | 0.6000 | 0.4500 | 0.4500 | 4:50 | — | — | | |
| | FORMULATION 40/32.5/27.5 | | | | | | | |
| 0.3 | 0.1200 | 0.0975 | 0.0825 | 2:30 | 34 | 32 | 250 | — |
| 0.4 | 0.1600 | 0.1300 | 0.1100 | 2:45 | 36 | 26 | 239 | — |
| 0.6 | 0.2400 | 0.1950 | 0.1650 | 3:40 | 40 | 16 | 212 | 420 |
| 0.8 | 0.3200 | 0.2600 | 0.2200 | 4:15 | 43 | 8 | 190 | 412 |
| 1.0 | 0.4000 | 0.3250 | 0.2750 | +5:00 | 43 | 6 | 160 | 340 |
| 1.2 | 0.4800 | 0.3900 | 0.3300 | +6:00 | 45 | 4 | — | 270 |
| | | | | 144°F. | | | 230°F. | |
| 0.1 | 0.040 | 0.0325 | 0.0275 | 1:45 | — | — | 245 | — |
| 0.2 | 0.080 | 0.0650 | 0.0550 | 2:30 | 30 | 42 | 220 | — |
| | | | | 172°F. | | | 260°F. | |
| 0.2 | 0.080 | 0.0650 | 0.0550 | 2:10 | 30 | 42 | 250 | — |
| 0.3 | 0.120 | 0.9750 | 0.0825 | 3:15 | 34 | 32 | 210 | — |
| | | | | 213°F. | | | 290°F. | |
| 0.8 | 0.3200 | 0.2600 | 0.2200 | 3:00 | | | 190 | |
| 1.0 | 0.4000 | 0.3250 | 0.2750 | 3:45 | 43 | 6 | 160 | 340 |
| 1.2 | 0.4800 | 0.3900 | 0.3300 | 4:50 | 45 | 4 | — | 270 |
| | | | | 230°F. | | | 290°F. | |

TABLE II-continued

| % of mixture in cement | % of active agent by weight of cement | | | Thickening Time Hr./min 206°F. | Viscosity cp 144°F. | Yield Point Lb./100 sq. ft. 144°F. | Compression Resistance at 8 hrs. Kg./sq. cm. 290°F. | Water Loss cm³/30 min. ΔP = 1000 psi. 206°F. |
|---|---|---|---|---|---|---|---|---|
| | Na CMC | Borax | Dextrin | | | | | |
| 1.0 | 0.4000 | 0.3250 | 0.2750 | 2:25 | 43 | 6 | 160 | 340 |
| 1.2 | 0.4800 | 0.3900 | 0.3300 | 3:15 | 45 | 4 | — | 270 |

| % of mixture in cement | % of active agent by weight of cement | | | Thickening Time Hr/min. 206°F. | Viscosity cp 144°C | Yield Point Lb/100 sq. ft. 144°F | Compression Resistence at 8 hrs. Kg/sq. cm. 290°C | Water Loss cm³/30 min. ΔP = 1000 psi 206°C |
|---|---|---|---|---|---|---|---|---|
| % | NH₄-CMC | Borax | Dextrine | | | | | |
| FORMULATION 40/32.5/27.5 | | | | | | | | |
| 0.4 | 0.160 | 0.130 | 0.1100 | 1:50 | 40 | 18 | 180 | |
| 0.6 | 0.240 | 0.195 | 0.1650 | 3:16 | 45 | 12 | 160 | |
| | | | | 213°F | | | | |
| 0.8 | 0.3200 | 0.2600 | 0.2200 | 2:04 | 50 | 4 | | |
| 1.0 | 0.4000 | 0.3250 | 0.2750 | 2:39 | 52 | 0 | | |
| 1.5 | 0.6000 | 0.4875 | 0.4125 | 5:08 | — | — | | |
| | | | | 172°C | | | | |
| 0.2 | 0.080 | 0.0650 | 0.0550 | 1:39 | 35 | 35 | | |
| 0.3 | 0.120 | 0.0975 | 0.0825 | 2:20 | 40 | 25 | | |
| 0.4 | 0.160 | 0.1300 | 0.1100 | 3:35 | 40 | 18 | | |
| 0.5 | 0.200 | 0.1625 | 0.1375 | 4:53 | 42 | 15 | | |
| | | | | 144°C | | | | |
| 0.2 | 0.080 | 0.0650 | 0.0550 | 1:53 | | | | |

TABLE III

LABORATORY DATA AND EXPERIMENTAL RESULTS UTILIZING SLURRIES PREPARED WITH TYPE G CEMENT, CMC, BORAX AND DEXTRINE AND SOME INORGANIC SALTS.

| % | % of active agent by weight of cement | | | | Thickening time Hr:min 206°F | Viscosity CP 144°F | Yield Point lb/100/sq.ft 144°F | Compression Resistance at 8 hr. kg/sq.cm 290°F |
|---|---|---|---|---|---|---|---|---|
| | NaCMC | BORAX | DEXTRINE | Sodium Sulfate | | | | |
| Formulation 40/32.5/27.5 | | | | | | | | |
| 0.4 | 0.1600 | 0.1300 | 0.1100 | 0.10 | 3:15 | 25 | 31 | |
| 0.6 | 0.2400 | 0.1950 | 0.1650 | 0.20 | 3:25 | 25 | 30 | |
| 0.8 | 0.3200 | 0.2600 | 0.2200 | 0.40 | 3:40 | 24 | 29 | |
| | | | | | 172°F | | | |
| 0.3 | 0.1200 | 0.0975 | 0.0825 | 0.15 | 3:05 | 23 | 33 | |
| 0.4 | 0.1600 | 0.1300 | 0.1100 | 0.30 | 3:20 | 25 | 31 | |
| 0.4 | 0.1600 | 0.1300 | 0.1100 | 0.35 | 3:25 | | | |
| | | | | | 144°F | | | |
| 0.2 | 0.0800 | 0.0650 | 0.0550 | 0.10 | 3:15 | | | |
| | | | | | 230°F | | | |
| 1.2 | 0.4800 | 0.3900 | 0.3300 | 0.30 | 3:10 | | | |
| 1.5 | 0.6000 | 0.4875 | 0.4125 | 0.40 | 3:25 | | | |
| | | | | Potassium Sulfate | | | | |
| | | | | | 144°F | | | |
| 0.2 | 0.0800 | 0.0650 | 0.0550 | 0.10 | 3:00 | | | |
| | | | | | 186°F | | | |
| 0.3 | 0.1200 | 0.0975 | 0.0825 | 0.30 | 3:10 | | | |
| 0.4 | 0.1600 | 0.1300 | 0.1100 | 0.40 | 3:25 | 26 | 32 | |

| % | % of active agent by weight of cement | | | | Thickening time Hr:min 144°F | Viscosity CP 144°F | Yield Point lb/100/sq.ft 144°F | Compression Resistance at 8 hr. kg/sq.cm. |
|---|---|---|---|---|---|---|---|---|
| | NaCMC | BORAX | DEXTRINE | Sodium sulfate | | | | |
| FORMULATION 40/32.5/27.5 | | | | | | | | |
| 0.2 | 0.080 | 0.0650 | 0.0550 | 0.20 | 3:20 | 36 | 27 | 70 |
| 0.3 | 0.120 | 0.0975 | 0.0825 | 0.40 | 3:45 | 35 | 32 | 160 |
| | | | | | 206°F | | | 290°F |
| 0.6 | 0.240 | 0.1950 | 0.1650 | 0.10 | 4:15 | 38 | 19 | 185 |
| 0.8 | 0.320 | 0.2600 | 0.2200 | 0.20 | 5:30 | 40 | 17 | 120 |
| 1.0 | 0.400 | 0.3250 | 0.2750 | 0.40 | +6:00 | 44 | 6 | 40 |

We claim:

1. A composition for retarding the setting of cement which comprises a mixture of at least one of the group consisting of carboxymethyl cellulose and alkali salts of carboxymethyl cellulose, borax and dextrin, in the proportions by weight of 35 to 40%, 30 to 35% and 25 to 30%, respectively.

2. A composition according to claim 1, which comprises 40% carboxymethyl cellulose alkali salt, 32.5% borax and 27.5% dextrin.

3. A composition according to claim 1 in which an inorganic salt selected from the group consisting of sodium sulphate and potassium sulphate is included.

* * * * *